Feb. 28, 1956  J. T. M. HOLT  2,736,253
SYNCHRONIZED CONTROL FOR TRACTOR CULTIVATORS
Filed Sept. 1, 1953  2 Sheets-Sheet 1
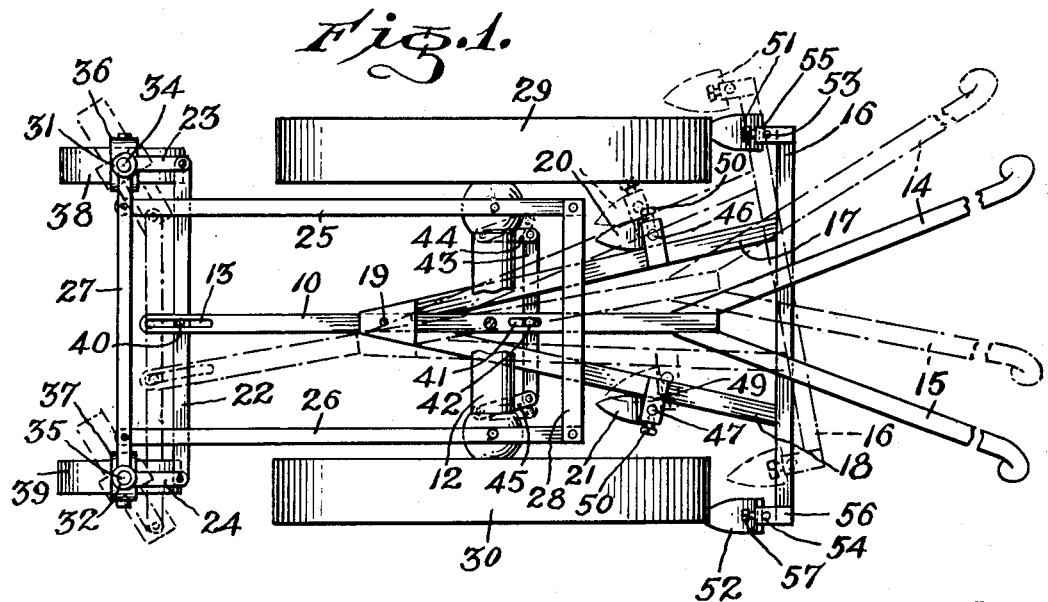
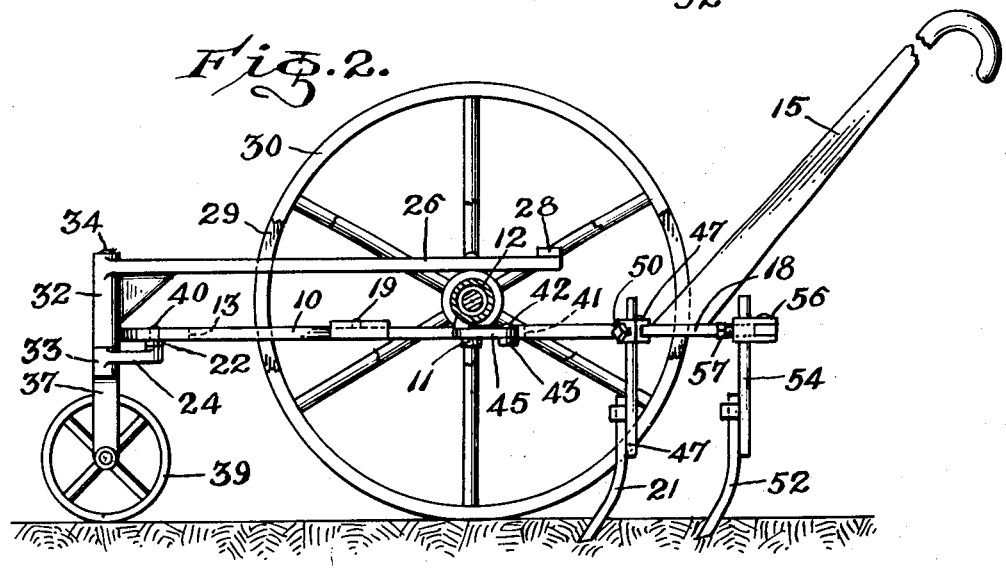
INVENTOR.
James T. M. Holt,
BY Victor J. Evans & Co.
ATTORNEYS Feb. 28, 1956 J. T. M. HOLT 2,736,253
SYNCHRONIZED CONTROL FOR TRACTOR CULTIVATORS
Filed Sept. 1, 1953 2 Sheets-Sheet 2
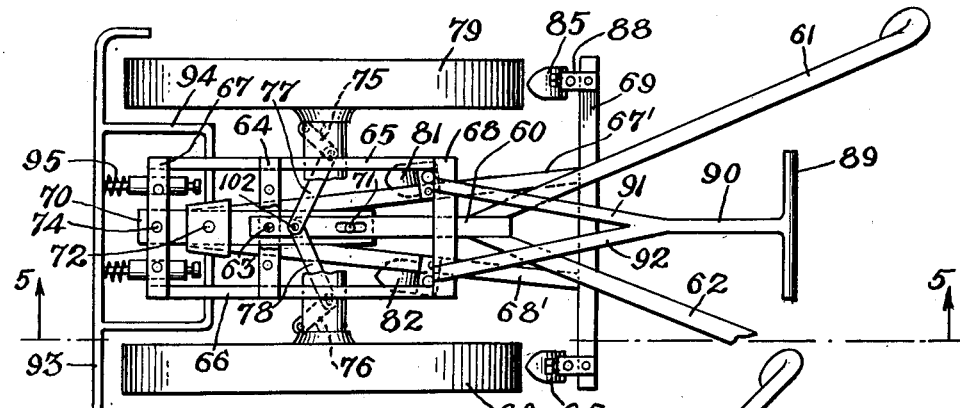
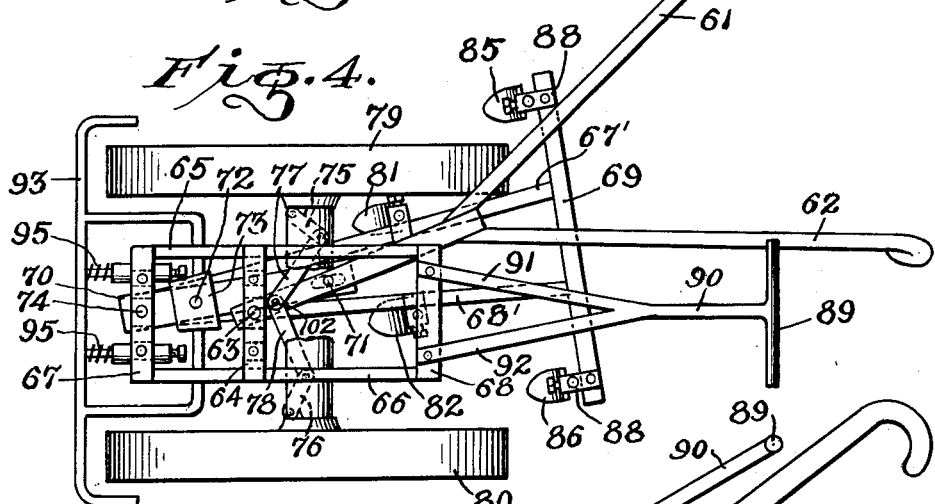
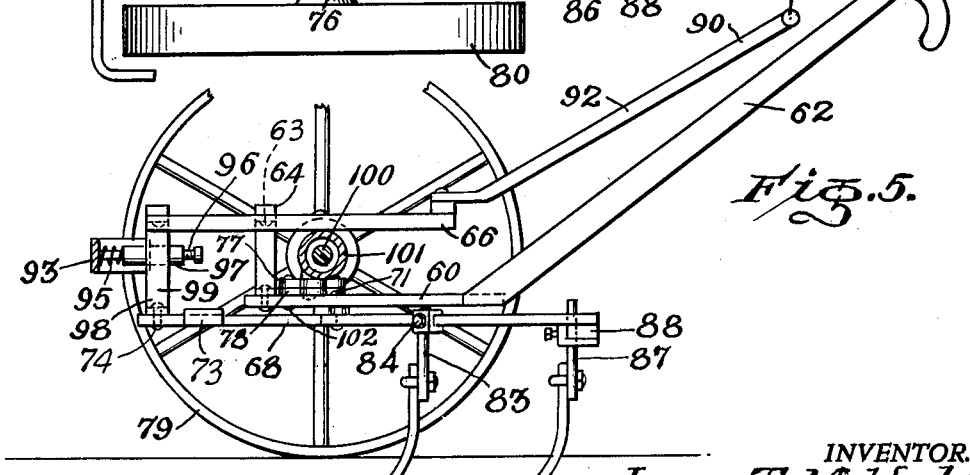
INVENTOR.
James T. M. Holt,
BY Victor J. Evans & Co.
ATTORNEYS

United States Patent Office 2,736,253
Patented Feb. 28, 1956

2,736,253

SYNCHRONIZED CONTROL FOR TRACTOR CULTIVATORS

James T. M. Holt, Tyler, Tex.

Application September 1, 1953, Serial No. 377,847

4 Claims. (Cl. 97—47.01)

This invention relates to garden tractors of the two and four wheel type, and in particular a tractor having a cultivator mounted thereon with the shovels of the cultivator pivotally mounted on the drawbar extended through the tractor at a point spaced forwardly of the driving wheels of the tractor whereby with the drawbar connected to the steering knuckles, wheel brakes and clutches the operator holds the shovels on the sides of a row of plants and the tractor follows the row.

One of the important advantages of mounting and controlling the plows in this manner is that drifting of a cultivator on a hillside, slope, or grade, which is a serious handicap in working with conventional tractor cultivators, is substantially overcome.

The purpose of this invention is to mount the shovels of a cultivator on a tractor whereby the shovels are adapted to be held to follow a row instead of attempting to steer the tractor so that the shovels, swinging from a point on the tractor frame, follow a row of plants.

With the conventional type of garden tractor a frame on which cultivator shovels are carried is pivotally connected to the chassis or frame of the tractor and as the tractor travels along a row of plants the shovels, being free to swing laterally move continuously from side to side and when a shovel strikes a rock or other obstruction the shovels swing into the row of plants, often plowing up several plants. With this thought in mind this invention contemplates a method of mounting the shovels on a tractor whereby the shovels are retained in position at the sides of a row of plants by the operator and wherein with the shovels held in this position the tractor also follows the row.

The object of this invention is, therefore, to provide means for attaching a drawbar of a tractor to steering instrumentalities of wheels of the tractor whereby with a frame having cultivator shovels depending therefrom pivotally connected to the drawbar at a point spaced forwardly of the axle of the tractor the steering instrumentalities are actuated by the drawbar so that the tractor follows the rows on the sides of which the shovels are held.

Another object of the invention is to provide means for mounting cultivator shovels on a tractor whereby the tractor steering elements are controlled by the position of the shovels of the cultivator and in which the device is adapted to be used on both two and four wheel tractors.

A further object of the invention is to provide means for mounting cultivator shovels on a tractor whereby the steering mechanism of the tractor is controlled by the position of the shovels of the cultivator and in which the device is of a simple and economical construction.

With these and other objects and advantages in view the invention embodies a tractor having a drawbar with a frame having cultivator shovels depending therefrom pivotally mounted on the drawbar of the tractor at a point spaced forwardly of the driving wheel axle of the tractor and with the drawbar connected by suitable means to steering elements of the tractor whereby lateral movement of the frame on which the shovels of the cultivator are carried adjusts the position of the steering elements whereby the tractor is turned to compensate for the position of the cultivator plow or shovels.

Other features and advantages of the invention will appear from the following description taken in connection with the drawings, wherein:

Figure 1 is a plan view of a tractor of the four wheel type showing the mounting of the cultivator plows on the tractor with the plows shown in a straight ahead position in full lines and in a position for turning in broken lines.

Figure 2 is a side elevational view of the tractor shown in Fig. 1 with parts of the main driving wheel on the near side of the tractor broken away and with other parts shown in section.

Figure 3 is a plan view of the tractor illustrating the mounting of the cultivator shovels on a tractor of the two wheel type.

Figure 4 is a plan view similar to that shown in Fig. 3 showing the cultivator shovels moved toward one side of the tractor.

Figure 5 is a side elevational view of the tractor shown in Figs. 3 and 4 with the wheel on the near side of the tractor omitted and the axle and bumper shown in section.

Referring now to the drawings wherein like reference characters denote corresponding parts the improved cultivator shovel mounting of this invention includes a drawbar 10 pivotally mounted on a tractor with a bolt 11, the bolt being secured to the axle housing 12, and the drawbar, which is provided with a slot 13 at the forward end and handles 14 and 15 at the trailing end is connected to a frame including a transverse bar 16 and diagonal braces 17 and 18 with a bolt 19 at a point spaced forwardly of the axle 12 whereby with shovels 20 and 21 depending from the cultivator frame held at the sides of a row of plants the tractor is steered by the tie rod 22 and arms 23 and 24 to follow the row.

In this design the tractor is mounted on a frame having side bars 25 and 26, a front bar 27 and a rear bar 28 and the frame is mounted on ground engaging wheels 29 and 30.

The front bar 27 of the frame is provided with hubs 31 and 32 in which steering knuckles 33, from which the arms 23 and 24 extend are mounted with pins 34 and 35 and the steering knuckles are positioned on yokes 36 and 37 in which wheels 38 and 39, respectively, are mounted. With the front wheels mounted on the tractor frame in this manner the wheels are readily turned from the position shown in full lines to the position shown in dotted lines as the drawbar 10 is moved laterally about the point 11 where the drawbar is pivotally connected to the axle of the tractor. The tie rod 22 is connected by a bolt 40 to the drawbar 10 with the bolt extended through the slot 13, the bolt being free to slide in the slot as shown by the dotted lines in Fig. 1.

The drawbar 10 is also provided with a slot 41 through which a bolt 42 extends, the bolt 42 being mounted on a bar 43 that is connected by links 44 and 45 to brakes or clutches of the wheels 29 and 30.

The shovels 20 and 21 are carried on the lower ends of rods 46 and 47 and the rods are secured in clamps 48 and 49, respectively with set screws 50. Additional plows 51 and 52, carried on the lower ends of rods 53 and 54, respectively are mounted on the ends of the bar 16, the rods 53 and 54 being secured in clamps 55 and 56 with set screws 57.

With the parts assembled in this manner the cultivator shovels 20 and 21 are held on opposite sides of a row of plants with the handles 14 and 15 and as the shovels are moved laterally, as indicated by the broken lines the wheels of the tractor are turned by means of the drawbar 10 and the bars 22 and 43 whereby the tractor will follow the row with the wheels equally spaced on opposite sides thereof. With the wheels responding in this manner the tractor may readily be turned at the end of a row so that the shovels will follow the next row or so that the cultivator may be returned on the same row.

In the design illustrated in Figs. 3, 4, and 5 a drawbar 60, having handles 61 and 62 extended from the rear portion thereof is pivotally connected with a bolt 63 to a cross bar 64 of a frame or chassis having side bars 65 and 66 and end bars 67 and 68; and the cultivator shovels are carried on a frame including diverging bars 67' and 68' and a cross bar 69, the frame being provided with a center beam 70 that is pivotally connected to the drawbar 60 with a pin 71 and to the shovel carrying frame with a pin 72 which extends through a clevis 73. The center bar 70 is pivotally connected to the front bar 67 of the tractor frame with a bolt 74 and the drawbar 60 is pivotally connected to arms 75 and 76 of clutches or brakes of the wheels with links 77 and 78, respectively. By this means wheels 79 and 80 are turned as the shovels 81 and 82 are moved laterally to follow a row of plants whereby with the shovels held on the row of plants the tractor will also follow the row. The shovels 81 and 82 are also carried on rods 83 with the rods secured in clamps 84, similar to the clamps shown in Figs. 1 and 2 and the frame is also provided with shovels 85 and 86 that are mounted on the tranverse bar 69 with rods 87 and clamps 88.

In this design the frame of the tractor is provided with an auxiliary handle 89, a stem 90 of which is secured to the bar 68 of the tractor frame with arms 91 and 92. The auxiliary handle 89 provides means for turning the tractor at the end of a row to prevent damaging plants of the rows.

In this design the frame of the tractor is also provided with a bumper 93 that is provided with a U-shaped brace 94 and the bumper is resiliently held with springs 95 that are positioned around studs 96 which extend through sleeves 97 in the bar or section 67 of the tractor frame. The bar or member 67 is also provided with a lower bar 98 and the bar 98 is connected to the bar 67 with struts 99.

The wheels 79 and 80 are carried on the ends of a rear axle 100 in a rear axle housing 101 and with the parts assembled in this manner lateral movement of the drawbar 60 by the handles 61 and 62 moves the shovels 81 and 82 whereby the shovels follow on opposite sides of a row of plants and with the pivot point of the drawbar positioned on the bolt 63 which is spaced forwardly of the axle of the tractor, and with the links 77 and 78 pivotally connected to the drawbar at the point 102 movement of the drawbar laterally releases the clutch or brake of a wheel on one side and causes the clutch or brake of the wheel on the opposite side to hold whereby the direction of travel of the tractor is turned toward the wheel held by the brake or clutch. By this means the tractor is turned with the shovels whereby upon holding the shovels equally spaced from a row of plants the tractor follows the row equally spacing parts thereof over the row of plants.

The attachments for both the two wheel and four wheel tractors, therefore, include a drawbar with a cultivator shovel carrying frame pivotally connected to the drawbar at a point spaced forwardly of the axle of the driving wheels of the tractor and means for actuating steering devices of the tractor by the drawbar whereby with the drawbar actuated by handles extended therefrom so that the inner shovels follow on opposite sides of a row of plants the steering mechanisms of the tractors are actuated so that the tractors also follow the rows of plants.

It will be understood that modifications, within the scope of the appended claims, may be made in the design and arrangement of the parts without departing from the spirit of the invention.

What is claimed is:

1. A cultivator attachment for use on a tractor having wheels carried by an axle comprising a drawbar adapted to be mounted in a longitudinally disposed position on the tractor, a cultivator shovel carrying frame comprising a pair of diverging bars connected at one of their ends by a crossbar and having their other ends pivotally connected to said drawbar at a point spaced forwardly of the axle of the tractor, handles extended from the drawbar for actuating the drawbar laterally to move the cultivator shovels laterally, and means actuated by the drawbar for steering the tractor.

2. A cultivator attachment for use on a tractor having wheels carried by an axle comprising a drawbar adapted to be mounted in a longitudinally disposed position on the tractor, a cultivator shovel carrying frame comprising a pair of diverging bars connected at one of their ends by a crossbar and having their other ends pivotally connected to said drawbar at a point spaced forwardly of the axle of the tractor, said shovel being initially and normally positioned on the crossbar of said frame outwardly of said diverging bars and equidistant from a crop row, handles extended from the drawbar for actuating the drawbar laterally to move the cultivator shovels laterally, and means actuated by the drawbar for steering the tractor, whereby with shovels of the cultivator frame moved to positions equally spaced from and on opposite sides of a row of plants the tractor will follow the row of plants.

3. A cultivator mounting for use on a tractor having ground engaging wheels mounted on an axle comprising a drawbar adapted to be mounted on the longitudinal center of a tractor and having handles extended from the rear end thereof, means pivotally connecting the drawbar to and below a housing extended around the axle of the tractor, a cultivator shovel carrying frame comprising a pair of diverging bars connected at one of their ends by a crossbar also positioned below the axle housing and the opposite ends of the diverging bars being pivotally connected to the drawbar at a point spaced forwardly of the axle of the tractor, and means connecting the drawbar to steering instrumentalities of the tractor whereby with the cultivator shovels held on opposite sides of a row of plants the tractor follows said row of plants.

4. In a cultivator mounting for a tractor, the combination which comprises a tractor chassis, an axle mounted in a housing on which the chassis is positioned, wheels on the ends of the axle, a drawbar positioned below and pivotally connected to the housing of the axle, a frame comprising a pair of diverging bars, a crossbar connected to one of the ends of said diverging bars, the opposite ends of said diverging bars being pivotally connected to the drawbar at a point spaced forwardly of the axle, means for mounting cultivator shovels on the crossbar of said frame, handles extended from the drawbar, and means connecting the drawbar to steering instrumentalities of the tractor.

References Cited in the file of this patent

UNITED STATES PATENTS

| 1,429,178 | Valentine et al. | Sept. 12, 1922 |
| 1,477,398 | Valentine et al. | Dec. 11, 1923 |
| 1,869,746 | Hoke | Aug. 2, 1932 |